US012763591B2

(12) United States Patent
Neitz et al.

(10) Patent No.: US 12,763,591 B2
(45) Date of Patent: Oct. 13, 2026

(54) METHOD AND DEVICE FOR THE TREATMENT OF FAULT CURRENTS IN A HIGH-VOLTAGE BATTERY CONNECTED TO A CHARGING STATION VIA A CHARGING CIRCUIT

(71) Applicant: Preh GmbH, Bad Neustadt a.d. Saale (DE)

(72) Inventors: Marc Neitz, Oberelsbach (DE); Gian Battista Cappelletti, Bad Kissingen (DE); Kaj-Uwe Decker, Munich (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 755 days.

(21) Appl. No.: 18/308,089

(22) Filed: Apr. 27, 2023

(65) Prior Publication Data

US 2023/0352948 A1 Nov. 2, 2023

(30) Foreign Application Priority Data

Apr. 27, 2022 (DE) ......................... 102022110248.3

(51) Int. Cl.
*H01M 10/44* (2006.01)
*H02J 7/60* (2026.01)
(Continued)

(52) U.S. Cl.
CPC *H02J 7/62* (2026.01); *H02J 7/64* (2026.01); *H02J 7/663* (2026.01); *H02J 7/80* (2026.01)

(58) Field of Classification Search
CPC ........ H02J 7/64; H02J 7/62; H02J 7/80; H02J 7/663; B60L 58/10; B60L 3/12; B60L 3/0046
(Continued)

(56) References Cited

U.S. PATENT DOCUMENTS

2020/0036180 A1* 1/2020 Spesser .................... H02H 9/08
2021/0101501 A1 4/2021 Neitz et al.

FOREIGN PATENT DOCUMENTS

DE 102018118259 A1 1/2020
DE 102019202892 A1 * 9/2020 ............ B60L 3/0069
(Continued)

OTHER PUBLICATIONS

German Office Action for DE102022110248.3, dated Dec. 17, 2022. German Patent and Trademark Office, Munich, Germany.
(Continued)

*Primary Examiner* — Edward Tso
(74) *Attorney, Agent, or Firm* — M&B IP Analysts, LLC

(57) ABSTRACT

A method for a treatment of fault currents in a high-voltage battery connected to a charging station via a charging circuit in a motor vehicle is presented. An electric protective-conductor connection is established between a protective conductor on the charging station side and a protective conductor on the battery side, which is electrically insulated to the first high-voltage potential on the battery side and the second high-voltage potential on the battery side to connect the protective conductor on the battery side via the protective conductor on the charging station side to a ground potential on the charging station side for the high-voltage battery. Upon a fault condition, a fault current circuit forms via the charging station and the protective-conductor connection with a fault current supplied from the high-voltage battery. The fault current is reduced and/or limited by a fault current controller of the charging circuit for a predetermined minimum duration.

20 Claims, 4 Drawing Sheets

Figure 1:
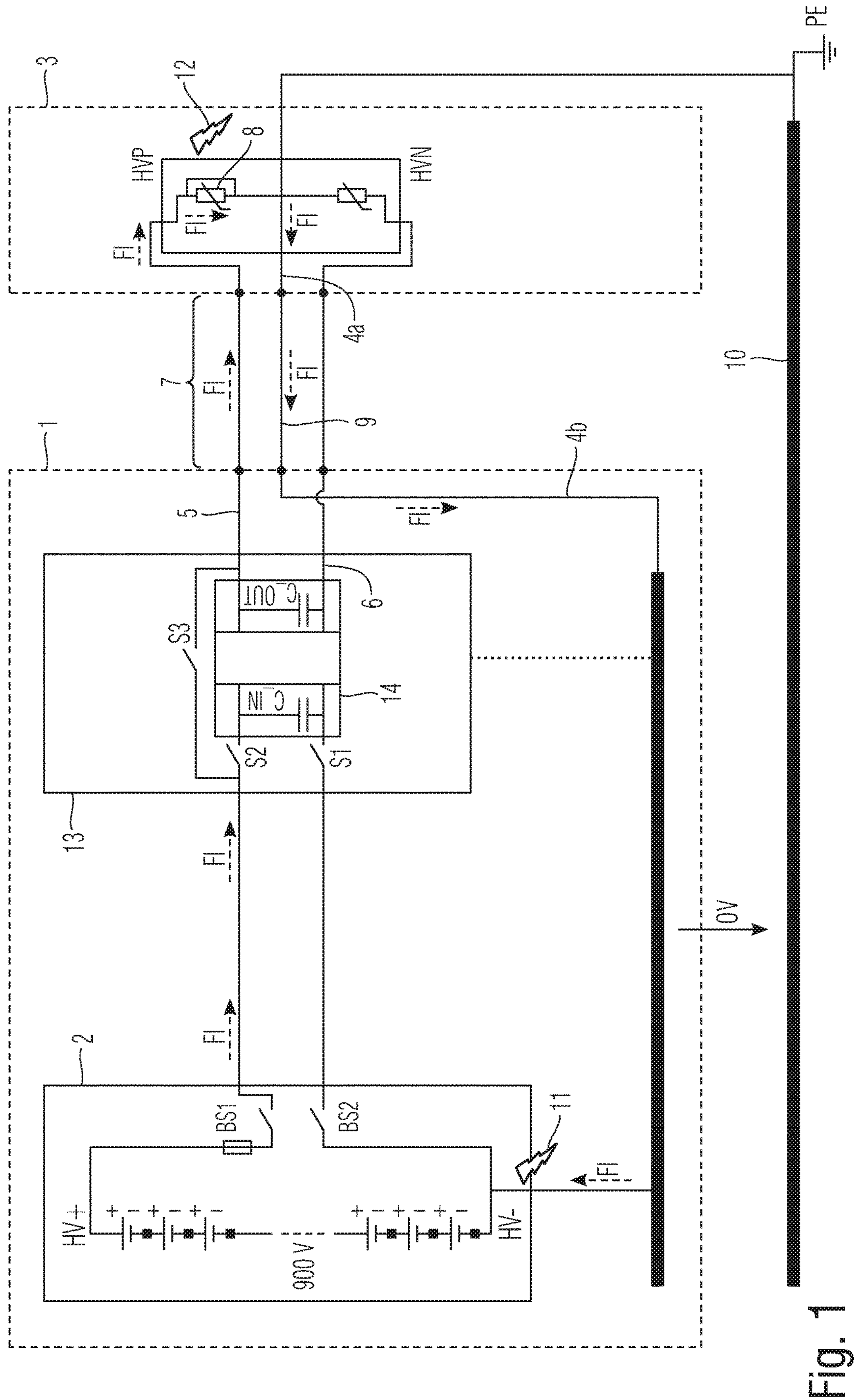

(51) Int. Cl.
*H02J 7/62* (2026.01)
*H02J 7/64* (2026.01)
*H02J 7/80* (2026.01)

(58) Field of Classification Search
USPC ......................... 320/104, 107, 134, 150, 153
See application file for complete search history.

(56) References Cited

FOREIGN PATENT DOCUMENTS

| | | | |
|---|---|---|---|
| DE | 102020007868 | A1 | 1/2022 |
| WO | 2021122234 | A1 | 6/2021 |

OTHER PUBLICATIONS

First Office Action for CN application No. 2023104152197, dated Dec. 26, 2025. China National Intellectual Property Administration, Beijing, China.

* cited by examiner

METHOD AND DEVICE FOR THE TREATMENT OF FAULT CURRENTS IN A HIGH-VOLTAGE BATTERY CONNECTED TO A CHARGING STATION VIA A CHARGING CIRCUIT

The present disclosure relates to a method for the treatment of fault currents in a high-voltage battery connected in an electrically conductive manner to a charging station via a charging circuit and an associated device. Electric vehicles (EV), such as hybrid electric vehicles (HEV) or battery electric vehicles (BEV), for instance, usually have a high-voltage battery (e.g. a traction battery) as an energy storage unit with a nominal voltage of 400 V or 800 V, for instance. In the present case—as is also customary in the automotive sector—an electric direct voltage of greater than 60 V, in particular greater than 200 V, e.g. 400 V or 800 V to about 1500 V, is understood to be a high voltage or high-voltage potential (herein also referred to as HV potential). An electric voltage of equal to or less than 60 V, e.g. 12 V, 24 V, 48 V or 60 V, is understood to be a low voltage or low-voltage potential. In connection with the disclosed embodiments, the terms high voltage or low voltage are used synonymously with the terms high-voltage potential or low-voltage potential, with the voltage levels or voltage ranges specified above.

When an electric vehicle with a high-voltage battery, e.g. a battery with a nominal battery voltage of 800 V, is charged at an external charging station providing a lower nominal charging voltage than the nominal battery voltage, i.e. lower than 800 V in the given example, e.g. 400 V, it is also customary to use a charging circuit with a boost converter, in this case a DC/DC converter, in order to convert the charging voltage provided by the charging station such that it corresponds to the nominal battery voltage of the high-voltage battery of the electric vehicle or is higher. Such a direct current converter may be provided in the electric vehicle, for instance. When charging by means of a cable, but also already when electrically connecting, without a charging current, the high-voltage battery to the charging station by means of a charging cable, it is required, according to DIN EN IEC 61851-1, to provide arrangements and measures for fault current protection; among other things, this includes the establishment of an electrically conductive protective-conductor connection of a protective conductor on the charging station side, which is conductively connected to a ground potential on the charging station side, to a protective conductor on the battery side, in order to connect the protective conductor on the battery side, which in a non-fault condition is electrically insulated with respect to the battery-side high-voltage potentials of the high-voltage battery, to a ground potential on the charging station side via the protective conductor on the charging station side. Typically, the protective conductor on the battery side is connected in an electrically conductive manner to the vehicle body, which is referred to as vehicle ground. In the event of a fault, in which one of the high-voltage potentials (HV+ or HV−) on the battery side connects with low resistance to the protective-conductor terminal on the battery side, which is understood to be a fault condition here, a fault current circuit via one of the electric charging connections, the charging station and the common protective conductor is produced, wherein the associated fault current is supplied by the high-voltage battery. As a rule, this fault current leads to protective elements, which are situated in the fault current circuit and are provided on the charging station side, “running away”, and, on the charging station side, results in the electric charging connection, to which the fault current is respectively applied, and the protective-conductor connection being connected with low resistance and thus being short-circuited, which leads to the fault current amperage increasing, putting a load on the protective-conductor connection exceeding the current-carrying capacity. However, the application to the protective-conductor connection of a potential relative to ground in an amount of more than 60 volts may, taken by itself, in the case of contact constitute a considerable risk for life and limb of the person in contact and must be avoided at all costs. Moreover, since the wiring on the charging station side forming the protective conductor in DC charging stations with a lower nominal charging voltage is not designed for a fault current of this strength, a sustained fault current results in excessive heating and finally in the protective conductor on the charging station side melting through, which constitutes a non-reversible damage to the charging station and strips the protective conductor of its function, so that the high-voltage potential (HV+ or HV−), which is electrically connected to the protective conductor on the battery side, is present on the protective conductor on the battery side and, in the case of contact, constitutes danger to the life and limb of the person in contact. Though it is known to use in high-voltage grids insulation monitoring devices or so-called “ISO monitors” for measuring an insulation resistance between the PE (protective conductor) and the lines carrying the high voltage, in order to be able to ensure the operational safety of the high-voltage charging grid, wherein, in the event the insulation resistance determined in the measurement is too low, a safety mechanism interrupts the current transmission, also of the fault current, e.g. by opening a switch, relay or the like. However, the ISO monitors have a certain sluggishness resulting from the delay between the detection and separation of the current transmission, so that this measure is insufficient for ensuring the required safety in the event of a fault condition as described above.

Against this background, the present disclosure is based on the object of providing a method for the treatment of fault currents and an associated charging device, which limits the effects of a fault current caused by the low-resistance electrical connection of a high-voltage terminal on the battery side to the protective conductor and thus improves the fault current protection, particularly the protection of persons and the protection against damages to the charging station, for the case that a charging station is connected to a high-voltage battery whose nominal battery voltage exceeds the nominal voltage of the charging station, in particular 400 V. In addition, the charging method and the charging device are supposed to be technically simple and capable of being implemented in a cost-effective manner, and be of a compact and low-weight construction.

This object is accomplished by a method having the features of claim 1 and a charging device having the features of the coordinated independent claim. Other particularly advantageous embodiments are disclosed by the respective dependent claims. It must be noted that the features cited individually in the claims can be combined with each other in any technologically meaningful manner (also across the boundaries of categories, such as method and device) and represent other embodiments. The description, in particular in connection with the Figures, additionally characterizes and specifies the disclosed embodiments.

It may also be noted that a conjunction “and/or” used hereinafter, which is situated between two features and links them to each other, should always be interpreted such that, in a first embodiment of the subject matter, only the first feature may be provided, in a second embodiment, only the second feature may be provided, and in a third embodiment, both the first and the second feature may be provided.

Further, a term "about" used herein is supposed to specify a tolerance range which the person skilled in the art working in the present field considers to be common. In particular, the term "about" is to be understood to mean a tolerance range of the quantity concerned of up to a maximum of +/−20%, preferably up to a maximum of +/−10%.

Relative terms concerning a feature, such as "larger", "smaller", "higher", "lower" and the like are to be interpreted such, within the framework of the disclosed embodiments, that deviations in size of the feature concerned, which are caused by production and/or realization and are within the production/realization tolerances defined for the respective production or realization of the feature concerned, do not fall under the respective relative term. In other words, a size of a feature is to be considered as being, for instance, "larger", "smaller", "higher", "lower" etc. than a size of a compared feature only if the two compared sizes differ so clearly in their amount that this difference in size certainly does not fall under the tolerance range caused by the production/realization of the feature concerned, but rather is the result of targeted action.

The method according to the present disclosure relates to the treatment of fault currents in a high-voltage battery connected to a charging station via an electric charging circuit, in particular in a motor vehicle. In a step of providing according to an embodiment, a high-voltage battery with a nominal battery voltage of about 900 volts, for example, and an associated charging circuit are provided. The high-voltage battery is not necessarily a traction battery of a motor vehicle driven by an electric motor, for example. Moreover, the charging circuit is provided, which has at least one boost converter and is preferably provided on the battery side, particularly on the motor vehicle side. "On the battery side" is understood to mean an arrangement, e.g. mechanically fixed and electrically connected, associated with the high-voltage battery.

In a further step of providing according to an embodiment, a charging station is provided, preferably a direct current charging station, with a nominal charging voltage which is smaller than the nominal battery voltage, such as about 450 volts, for instance. The charging station is connected to a power grid, for example.

According to the present disclosure, a connecting step is provided, in which an electric protective-conductor connection between a protective conductor on the charging station side and a protective conductor on the battery side is established, in order to connect the protective conductor on the battery side via the protective conductor on the charging station side to a ground potential on the charging station side, which is also referred to as "PE" or "Protective Earth". The protective conductor on the charging station side and the protective conductor on the battery side form, via the protective-conductor connection, a common protective conductor connected to the ground potential on the charging station side. In a non-fault condition, the protective conductor on the battery side, and thus the common protective conductor, is electrically insulated with respect to the first high-voltage potential on the battery side and the second high-voltage potential on the battery side.

According to the present disclosure, another connecting step, which is executed almost simultaneously with the above-mentioned connecting step, is provided, in order to establish one electric charging connection, respectively, of the first high-voltage potential on the charging station side to the first high-voltage potential on the battery side and of the second high-voltage potential on the charging station side to a second high-voltage potential on the battery side, in order to apply to the high-voltage battery, in an optionally executed charging step, a charging voltage, which is higher than the nominal charging voltage of the charging station and has been boost-converted by the boost converter, such as a DC/DC converter, in order to transmit electrical energy from the charging station into the high-voltage battery.

Preferably, the electric protective-conductor connection and the multiple charging connections are established by means of a charging cable, which can be connected to the high-voltage battery on the one hand and, on the other hand, to the charging station via one or more plug-in connections. In this case, the initial situation is identical with the one described above.

In the event of the occurrence of a fault condition, in which, by low-resistance connection of the first high-voltage potential on the battery side or of the second high-voltage potential on the battery side to the protective-conductor terminal on the battery side, a fault current circuit forms via the charging station and the common protective conductor, with a fault current supplied from the high-voltage battery, the method provides a step in which the fault current is reduced by a fault current controller, e.g. a fault current limiter, to a reduced fault current and/or limited to a reduced fault current during the fault condition. Optionally, the limiting or reducing takes place immediately or with a delay after a positive detection of the fault condition by a detection device, and optionally only after the activation of the fault current controller, e.g. connecting the fault current controller to the fault current circuit. For example, the delay is the result of signal processing and/or the delayed activation of the fault current controller, which may possibly be necessary.

By means of the reduction or limitation of the fault current according to the present disclosure, at least one of the above-mentioned fault condition scenarios can be avoided, such as a short circuit of the protective element on the charging station side, melting and interruption of the protective-conductor connection, and at least an application of potential corresponding to the high-voltage potential to the protective-conductor terminal on the battery side.

Preferably, the fault current is limited by the fault current controller such that a contact potential, which is present on the protective-conductor terminal on the battery side, with respect to the ground potential on the charging station side is no greater than 350 volts, preferably no greater than 60 volts. Thus, danger to persons, e.g. in the case of manual contact with the protective-conductor terminal on the battery side, can be avoided.

Preferably, a minimum cross section of the protective conductor on the charging station side, e.g. as a part of the internal wiring of the charging station, is 0.75 $mm^2$ or less. For example, the fault current is adjusted by the fault current controller such that the current-carrying capacity of the protective conductor on the charging station side is not jeopardized.

Preferably, the charging station has a protective element to which the fault current is applied, such as a varistor, across which a fault voltage, which more preferably amounts to more than 50% of the nominal battery voltage, drops in the fault condition. For example, the fault current is adjusted by the fault current controller such that the current-carrying capacity of the protective element is not jeopardized.

According to one embodiment, the fault current controller is integrated into the common protective conductor, e.g. into the charging cable. Preferably, the fault current controller is integrated into the protective conductor on the battery side, which makes an activation, e.g. electrical connection, of the fault current controller dispensable. Preferably, the fault current controller is a part of the electric charging circuit and is activated by a charging circuit component, for example.

According to a preferred embodiment, the fault current controller is provided in the electric charging connection, which consists of the first and the second charging connection and to which the fault current is applied. Preferably, all charging connections are provided with a fault current controller.

Preferably, it is provided that the fault current circuit is interrupted within a time frame of maximally 20 ms, more preferably maximally 15 ms, most preferably maximally 10 ms, after the positive detection of the fault condition.

In one embodiment, the positive detection is the result of a voltage monitoring of the protective-conductor connection, in particular of the protective conductor on the battery side. For example, if the measured voltage present on the protective conductor on the battery side is found to converge on one of the high-voltage potentials on the battery side to a predefined extent, the fault condition is positively detected.

According to a preferred embodiment, the fault condition is determined by an insulation monitoring device for determining and monitoring an insulation resistance between the first high-voltage potential (HVP) on the battery side and the protective conductor on the battery side and/or between the second high-voltage potential (HVP) on the battery side and the protective conductor on the battery side, and the fault condition is positively detected, for example, based on the respective insulation resistance dropping below a respectively predetermined value.

Preferably, at least the electric charging connection carrying the fault current, which consists of the first and second charging connections, is interrupted after the minimum duration by a protective device, such as a switching relay, on the battery side, which is preferably provided outside of the charging station. Preferably, the protective device comprises a pyrotechnical separating member and/or a reversibly separating semiconductor element.

The disclosed embodiments further relate to a charging circuit, particularly of a motor vehicle, which is configured to carry out, in cooperation with a high-voltage battery having a nominal battery voltage and a charging station with a nominal charging voltage lower than the nominal battery voltage, the method for the treatment of fault currents of any one of the above-described embodiments, wherein the charging circuit has at least the fault current controller described above. For this purpose, the charging circuit, for instance, has a controller in the form of a digital processing unit, e.g. a microprocessor, microcontroller digital signal processor (DSP) etc. In order to avoid delays caused by the digital signal processing, the charging circuit has a largely discrete configuration. Preferably, at least the fault current controller, and, if provided, the activation circuit required for its activation, have a discrete configuration.

The disclosed embodiments further relate to an assembly comprised of a charging station, a high-voltage battery and a charging circuit, as described above.

It is noted that, with regard to device-related definitions of terms and the effects and advantages of features of the device, reference may made in full to the disclosure of corresponding definitions, effects and advantages of the method according to the disclosed embodiments and vice versa. Thus, a repetition of explanations of features that are basically the same, their effects and advantages may be largely omitted herein for the sake of a more compact description, without such omissions having to be interpreted as limitations for the respective subject matter of the disclosed embodiments.

Figure 2:
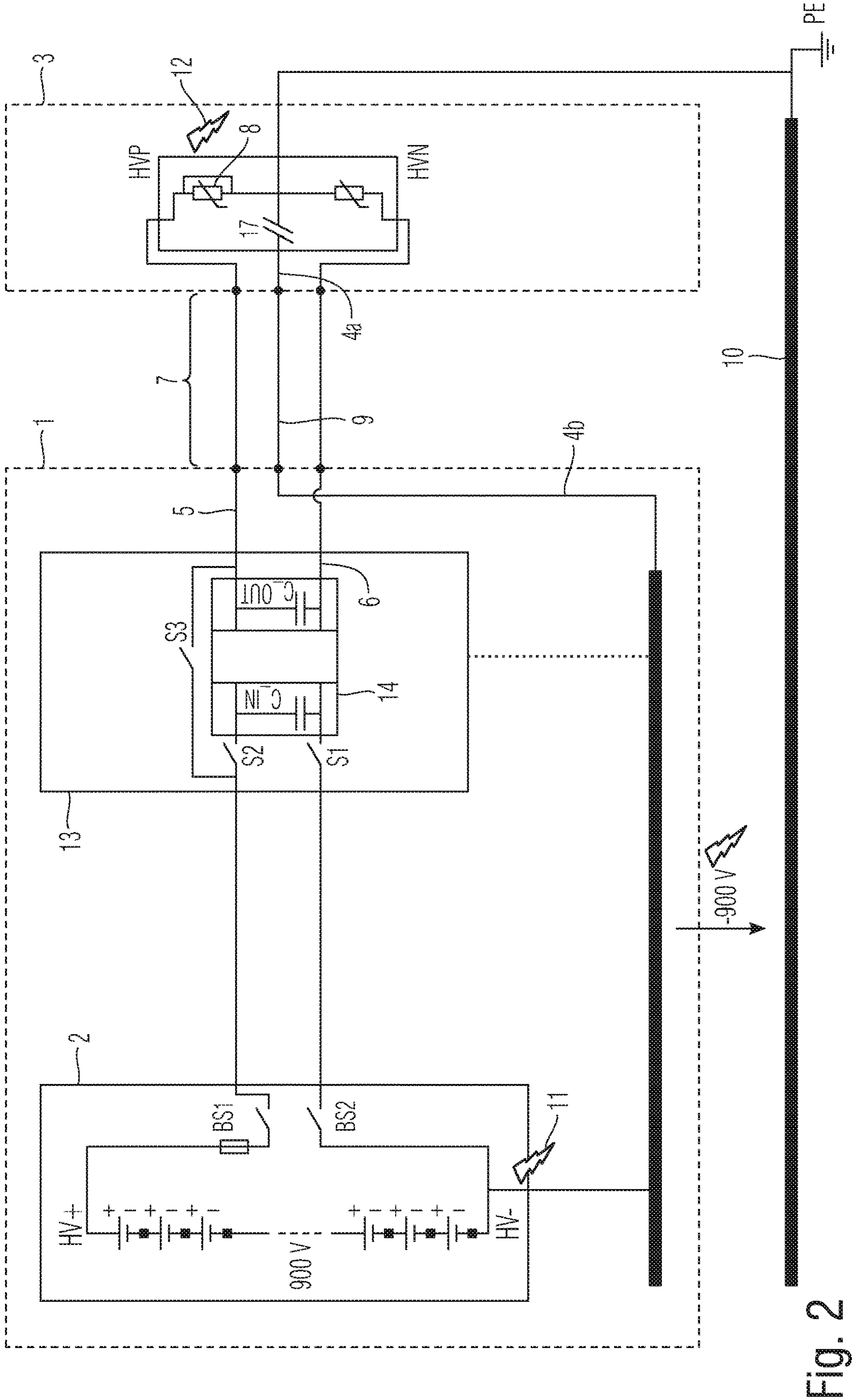
Figure 3:
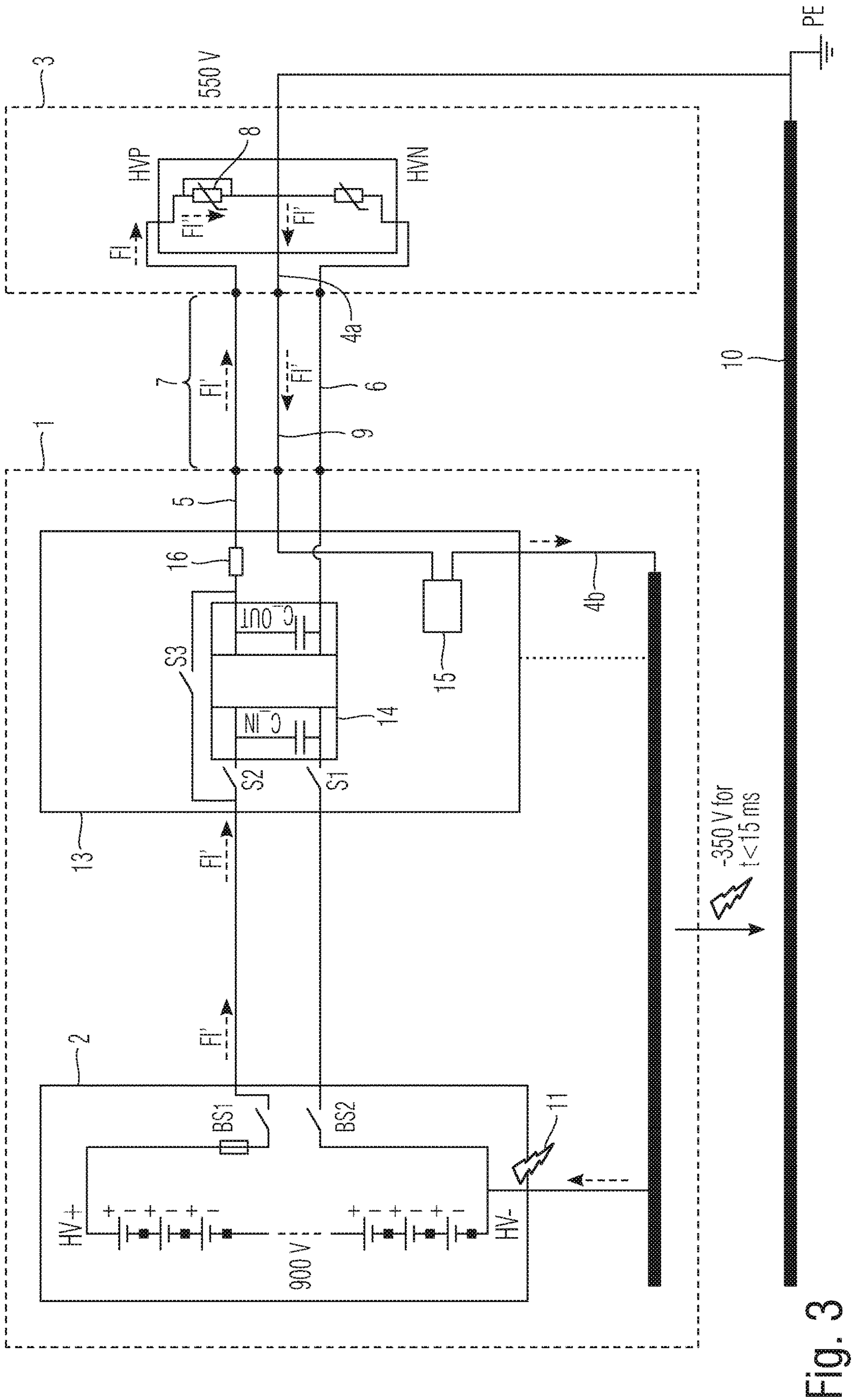
Figure 4:
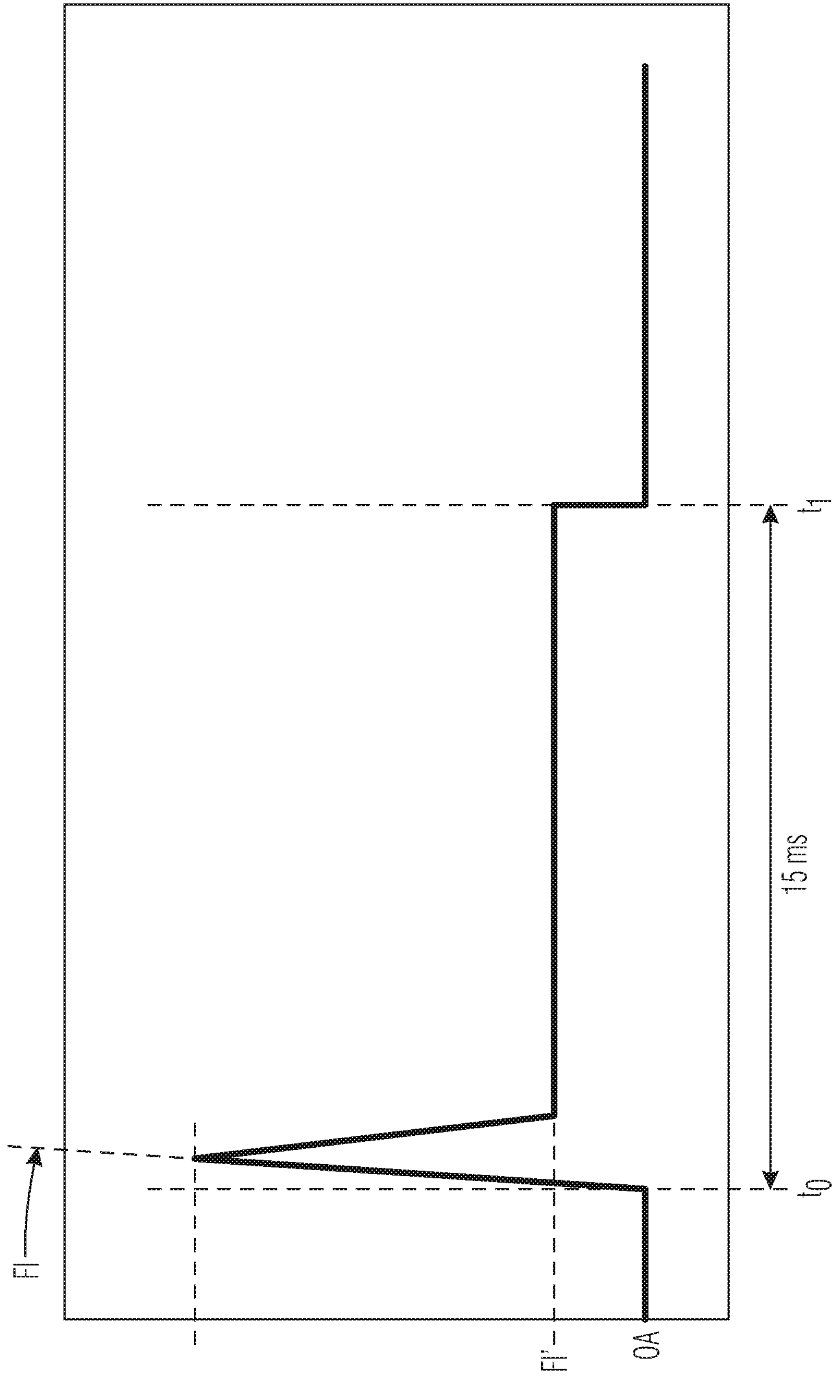

Other advantages and features of the disclosed embodiments become apparent from the following description of exemplary embodiments of the present disclosure, which shall be understood not to be limiting and which will be explained below with reference to the drawing. In this drawing, the Figures schematically show:

FIG. 1 a schematic function illustration for explaining the fault condition, which is to be countered by the method according to an embodiment, with the first fault scenario that can be avoided by the embodiment;

FIG. 2 a schematic function illustration for explaining a second fault scenario, which results from the fault condition and can be avoided by an embodiment;

FIG. 3 a schematic function illustration for explaining the process sequence according to an embodiment;

FIG. 4 a schematic representation of the curve of the fault current.

In the various figures, parts that are equivalent with respect to their function are always provided with the same reference numerals, so that they are also only described once, as a rule.

When, as shown in FIG. 1, a motor vehicle 1, in this case an electric vehicle, with a high-voltage battery 2, e.g. a battery with a nominal battery voltage of 900 V, is charged at an external charging station 3 via a cable 7 and the charging station 3 provides a lower nominal charging voltage than the nominal battery voltage, i.e. lower than 900 V in the given example, e.g. 450 V, a charging circuit 13 with a boost converter 14, in this case a DC/DC converter, is used in order to convert the charging voltage provided by the charging station 3 such that it corresponds to the nominal battery voltage of the high-voltage battery 2 of the motor vehicle or is higher. When charging by means of a cable, but also already when electrically connecting, without a charging current, the high-voltage battery 2 to the charging station 3 by means of a charging cable 7, it is required, according to DIN EN IEC 61851-1, to provide arrangements and measures for fault current protection; among other things, this includes the establishment of an electrically conductive protective-conductor connection 9 of a protective conductor **4*a* on the charging station side, which is conductively connected to a ground potential PE on the charging station side, to a protective conductor 4*b* on the battery side, in order to connect the protective conductor 4*b* on the battery side, which in a non-fault condition is electrically insulated with respect to the battery-side high-voltage potentials HV+ and HV− of the high-voltage battery 2, to the ground potential PE on the charging station side via the protective conductor 4*a* on the charging station side. Typically, the protective conductor 4*b* on the battery side is at least partially formed by the vehicle body, and is typically referred to as vehicle ground. In addition to the protective-conductor connection 9 established by means of the cable 7, multiple charging connections 5, 6 are also formed when establishing the plug-in connections, wherein, on the one hand, the first high-voltage potential HVP on the charging station side is connected to the first high-voltage potential HV+ on the battery side via the charging circuit 13, and, on the other hand, the second high-voltage potential HVN on the charging station side is connected to the second high-voltage potential HV− on the battery side via the charging circuit 13**. In a charging step, a charging voltage, which is higher than the nominal charging voltage of the charging station 3 and has been boost-converted by the boost converter 14 belonging to the charging circuit 13, can be applied to the high-voltage battery 2, in order to transmit electrical energy from the charging station 3 into the high-voltage battery 2.

In the event of a fault, in which one of the high-voltage potentials HV+ or HV−, in this case HV−, on the battery side connects with low resistance to the protective-conductor terminal 4*b* on the battery side, which is understood to be a fault condition here and symbolized by the lightning flash 11, a fault current circuit via one, in this case 5, of the electric charging connections 5, 6, the charging station 3 and the common protective-conductor connection 9 is produced, wherein the associated fault current FI indicated by arrows is supplied by the high-voltage battery 2. As a rule, this fault current FI leads to protective elements 8, which are affected by the fault current circuit and are provided on the charging station side, "running away", and, on the charging station side, results in the electric charging connection 5 of the several charging connections 5, 6, to which the fault current is respectively applied, and the protective-conductor connection 9 being connected with low resistance and thus being short-circuited, which leads to the fault current amperage increasing, to a potential being present on the protective-conductor connection 9, which amounts to more than 60 volts and is dangerous to contact, and to putting a load on the protective-conductor connection 9 exceeding the current-carrying capacity. Moreover, since the wiring on the charging station side forming the protective conductor 4*a* on the charging station side, in particular in DC charging stations with a lower nominal charging voltage, is not designed for a fault current of this strength, a sustained fault current FI results in excessive heating and finally in the protective conductor 4*a* on the charging station side melting through, as is shown in FIG. 2 and indicated by the interruption marked with the reference numeral 17. This constitutes a non-reversible damage to the charging station 3 and strips the protective conductor connection 9 of its function, so that the high-voltage potential HV+ or HV−, here HV−, which is electrically connected to the protective conductor 4*b* on the battery side, is present on the protective conductor 4*b* on the battery side and, with a voltage amounting to more than 60 V relative to ground, constitutes a voltage dangerous in case of contact and thus a danger to the life and limb of the person in contact.

These fault scenarios are avoided by the method according to an embodiment and explained with reference to FIG. 3. The initial situation is identical with the one described above. The method according to an embodiment relates to the treatment of fault currents in a high-voltage battery 2 in a motor vehicle 1 connected to a charging station 3 via an electric charging circuit 13. In a step of providing according to an embodiment, the high-voltage battery 2 with a nominal battery voltage of about 900 volts, for example, and an associated charging circuit 13 are provided. The high-voltage battery 2 is not necessarily a traction battery of a motor vehicle 1 driven by an electric motor, for example. Moreover, a charging circuit is provided, which has at least one boost converter and is preferably provided on the battery side, particularly on the motor vehicle side. "On the battery side" is understood to mean an arrangement, e.g. mechanically fixed and electrically connected, associated with the high-voltage battery 2.

In a further step of providing according to an embodiment, a charging station 3 is provided, preferably a direct current charging station, with a nominal charging voltage which is smaller than the nominal battery voltage, such as about 450 volts, for instance. The charging station 3 is connected to a power grid, for example, which is not shown.

According to an embodiment, a connecting step is provided, in which an electric protective-conductor connection 9 between a protective conductor on the charging station side and a protective conductor on the battery side is established, in order to connect the protective conductor 4*b* on the battery side via the protective conductor 4*a* on the charging station side to a ground potential PE on the charging station side. The protective conductor 4*a* on the charging station side and the protective conductor 4*b* on the battery side form, via the protective-conductor connection 9, a common protective conductor connected to the ground potential PE on the charging station side. In a non-fault condition, the protective conductor 4*b* on the battery side, and thus the common protective conductor, is electrically insulated with respect to the first high-voltage potential HV+ on the battery side and the second high-voltage potential HV− on the battery side, and not electrically connected, as is symbolized by the lightning flash 11 of FIG. 3.

According to an embodiment, another connecting step, which is executed almost simultaneously with the above-mentioned connecting step, is provided, in order to establish one electric charging connection 5, 6, respectively, of, on the one hand, the first high-voltage potential HVP on the charging station side to the first high-voltage potential HV+ on the battery side and, on the other hand, of the second high-voltage potential HVN on the charging station side to a second high-voltage potential HV− on the battery side, in order to apply to the high-voltage battery 2, in an optionally executed charging step, a charging voltage, which is higher than the nominal charging voltage of the charging station and has been boost-converted by the boost converter 14, such as a DC/DC converter, in order to transmit electrical energy from the charging station 3 into the high-voltage battery 2. Here, the electric protective-conductor connection 9 and the multiple charging connections 5, 6 are established by means of a charging cable 7, which can be connected to the high-voltage battery 2 on the one hand and, on the other hand, to the charging station 3 via one or more plug-in connections.

In the event of the occurrence of a fault condition as indicated by the lightning flash 11, in which, by low-resistance connection of the first high-voltage potential HV+ on the battery side or of the second high-voltage potential HV− on the battery side, in this case the latter, to the protective-conductor terminal 4*b* on the battery side, a fault current circuit forms via the charging station 3 and the protective-conductor terminal 9, with a fault current supplied from the high-voltage battery 2, the method provides the following step. At least for a predetermined minimum duration during the fault condition, the fault current FI is reduced to a reduced fault current FI' and/or the fault current FI is limited for a predetermined time frame to a reduced fault current FI' by a fault current controller 15, e.g. a fault current limiter. Optionally, the limiting or reducing takes place immediately upon occurrence of the fault condition or with a delay after a positive detection of the fault condition by a detection device, which is not shown.

By means of the reduction or limitation of the fault current according to an embodiment, at least one of the above-mentioned fault condition scenarios can be avoided, such as a short circuit of the protective element 8 on the charging station side, as shown in FIG. 1, melting and interruption of one of the protective conductors, particularly of the protective conductor 4*a* on the charging station side, and at least an application of one of the high-voltage potentials HV+ or HV− to the protective-conductor terminal 4*b* on the battery side.

In the embodiment shown here, a minimum cross section of the protective conductor 4*a* on the charging station side, e.g. as a part of the internal wiring of the charging station 3, is 0.75 $mm^2$ or less. For example, the fault current FI is adjusted by the fault current controller 15 such that the current-carrying capacity of the common protective conductor, particularly of the protective conductor 4*a* on the charging station side, is not jeopardized over the predetermined time frame.

Here, the charging station 3 has a protective element 8 to which the fault current FI is applied, such as a varistor, across which a fault voltage of 550V, which at minimum makes up a fraction of the nominal battery voltage, drops in the fault condition. For example, the fault current FI is adjusted by the fault current controller 15 such that the current-carrying capacity of the protective element 8 is not jeopardized at least for the predetermined time frame.

As is shown in FIG. 3, the fault current controller 15 is integrated into the protective conductor 4*b* on the battery side, and is a part of the electric charging circuit 13.

Here, the fault current FI is limited by the fault current controller 15 such that a contact potential, which is present on the protective conductor 4*b* on the battery side, with respect to the ground potential on the charging station side is no greater than 350 volts. Thus, danger to persons, e.g. in the case of manual contact with the protective conductor 4*b* on the battery side, can be avoided. In the illustrated embodiment, the minimum duration is at least 15 ms, over which the fault current controller 15, starting at the onset of the fault condition, and including a certain response time, if necessary, reduces the fault current FI to a reduced fault current FI', as is shown in FIG. 4. In this case, the dashed line indicates the curve of the fault current FI as it would develop without the measure according to an embodiment, before finally, the interruption, which is not shown in FIG. 4, sets in, as explained in connection with FIG. 2. The interruption of the fault current FI' starting at the point in time t1 is the result of at least the electric charging connection of the two charging connections 5, 6 carrying the fault current being interrupted by a protective device 16 on the battery side shown in FIG. 3, such as a pyrotechnical separating member, after the minimum duration.

What is claimed is:

1. A method for the treatment of fault currents in a high-voltage battery connected to a charging station via a charging circuit, in particular in a motor vehicle, comprising the steps:

providing the high-voltage battery, with a nominal battery voltage present between a first high-voltage potential on a battery side and a second high-voltage potential on the battery side;

providing the charging circuit;

providing the charging station, with a nominal charging voltage, which is smaller than the nominal battery voltage, present between a first high-voltage potential on a charging station side and a second high-voltage potential on the charging station side, establishing an electric protective-conductor connection between a protective conductor on the charging station side and a protective conductor on the battery side, which is electrically insulated, in a non-fault condition, with respect to the first high-voltage potential on the battery side and the second high-voltage potential on the battery side, in order to connect the protective conductor on the battery side via the protective conductor on the charging station side to a ground potential on the charging station side;

establishing one electric charging connection, respectively, of the first high-voltage potential on the charging station side to the first high-voltage potential on the battery side and of the second high-voltage potential on the charging station side to a second high-voltage potential on the battery side via the charging circuit, in order to apply to the high-voltage battery, in an optional charging step, a charging voltage, which is higher than the nominal charging voltage of the charging station and has been boost-converted by a boost converter belonging to the charging circuit, in order to transmit electrical energy from the charging station into the high-voltage battery;

occurrence of a fault condition, in which, by a low-resistance connection of the first high-voltage potential on the battery side or of the second high-voltage potential on the battery side to the protective conductor on the battery side, a fault current circuit forms via the charging station and the protective-conductor connection, with a fault current supplied from the high-voltage battery;

reducing the fault current during the fault condition, by a fault current controller belonging to the charging circuit, to a reduced fault current, the reduced fault current being greater than zero but less than the fault current.

2. The method according to claim 1, wherein the reduced fault current is adjusted by the fault current controller such that a contact potential, which is present on the protective conductor on the battery side, with respect to the ground potential on the charging station side is no greater than 350 volts.

3. The method according to claim 1, wherein the protective conductor on the charging station side has a minimum cross section of 0.75 $mm^2$ or less.

4. The method according to claim 1, wherein the charging station has a protective element which is provided in the charging connection to which the fault current is applied in the fault condition, and across which a fault voltage, drops in the fault condition.

5. The method according to claim 1, wherein the fault current is reduced and/or limited by the fault current controller such that a current-carrying capacity of the protective conductor on the charging station side and/or of the protective element is not exceeded by the fault current.

6. The method according to claim 1, wherein the fault current controller is integrated into the protective conductor on the battery side.

7. The method according to claim 1, wherein the fault current controller is provided in the electric charging connection to which the fault current is applied.

8. The method according to claim 1, wherein the fault current circuit is interrupted within a time frame of maximally 20 ms which follows a positive detection of the fault condition.

9. The method according to claim 1, wherein the fault condition is determined by an insulation monitoring device for determining and monitoring an insulation resistance of at least one of: between the first high-voltage potential on the battery side and the protective conductor on the battery side and between the second high-voltage potential on the battery side and the protective conductor on the battery side, and wherein the fault condition is positively detected.

10. The method according to claim 1, wherein at least the electric charging connection carrying the reduced fault current is interrupted by a protective device of the charging circuit which is provided outside of the charging station.

11. The method according to claim 10, wherein the protective device has at least one of: a pyrotechnical separating member and a reversibly separating semiconductor element.

12. A charging circuit of a motor vehicle, comprises at least the fault current controller, wherein the charging circuit is configured to carry out, in cooperation with a high-voltage battery having a nominal battery voltage and a charging station with a nominal charging voltage lower than the nominal battery voltage, a treatment of fault currents according to claim 1.

13. The method according to claim 1, further comprising: reducing and/or limiting the fault current during the fault condition, by a fault current controller belonging to the charging circuit, to a reduced fault current after a positive detection of the fault condition.

14. The method according to claim 1, wherein the reduced fault current is adjusted by the fault current controller such that a contact potential, which is present on the protective conductor on the battery side, with respect to the ground potential on the charging station side is no greater than 60 volts.

15. The method according to claim 4, wherein the protective element is a varistor.

16. The method according to claim 4, wherein the fault voltage amounts to more than 50% of the nominal battery voltage.

17. The method according to claim 1, wherein the fault current is interrupted within a time frame of maximally 15 ms, which follows a positive detection of the fault condition.

18. The method according to claim 1, wherein the fault current is interrupted within a time frame of maximally 10 ms, which follows a positive detection of the fault condition.

19. The method according to claim 1, wherein at least the electric charging connection carrying the reduced fault current is interrupted by a protective device of the charging circuit which is provided on the battery side.

20. The method according to claim 9, wherein the fault condition is determined based on the respective insulation resistance dropping below a respectively predetermined value.

* * * * *